US 6,637,533 B2

(12) United States Patent
Bertone

(10) Patent No.: US 6,637,533 B2
(45) Date of Patent: Oct. 28, 2003

(54) INTERACTIVE TRANSPORTING SYSTEM FOR MOVING PEOPLE AROUND IN AN ENVIRONMENT

(76) Inventor: Fabrizio Bertone, Via Manara, 6, I-10133 Turin (IT)

( * ) Notice: Subject to any disclaimer, the term of this patent is extended or adjusted under 35 U.S.C. 154(b) by 0 days.

(21) Appl. No.: 09/832,545

(22) Filed: Apr. 11, 2001

(65) Prior Publication Data

US 2001/0027885 A1 Oct. 11, 2001

(30) Foreign Application Priority Data

Apr. 5, 2000 (IT) .................................. TO2000A000420

(51) Int. Cl.⁷ ................................................ B60T 7/16
(52) U.S. Cl. ..................................................... 180/168
(58) Field of Search ................................ 180/167, 168, 180/169, 65.1, 315; 701/26; 235/383, 431; 186/55

(56) References Cited

U.S. PATENT DOCUMENTS

| | | | | |
|---|---|---|---|---|
| 3,741,345 A | * | 6/1973 | Saridis | ........................ 186/55 |
| 4,071,740 A | * | 1/1978 | Gogulski | ..................... 235/431 |
| 4,558,300 A | | 12/1985 | Goldman | |
| 4,700,302 A | * | 10/1987 | Arakawa et al. | ............ 180/168 |
| 5,250,789 A | * | 10/1993 | Johnsen | ....................... 235/383 |
| 5,418,354 A | * | 5/1995 | Halling et al. | ............... 235/383 |
| 5,467,273 A | * | 11/1995 | Faibish et al. | .............. 180/169 |
| 5,696,675 A | * | 12/1997 | Nakamura et al. | .......... 180/167 |
| 5,821,513 A | | 10/1998 | O'Hagan et al. | |
| 6,032,127 A | | 2/2000 | Schkolnick et al. | |
| 6,182,008 B1 | * | 1/2001 | Nikiel et al. | ................... 701/26 |
| 6,240,362 B1 | * | 5/2001 | Gaspard, II | .................. 701/26 |
| 6,435,407 B1 | * | 8/2002 | Fiordelisi | ..................... 235/383 |
| 6,484,939 B1 | * | 11/2002 | Blaeuer | ........................ 235/383 |

FOREIGN PATENT DOCUMENTS

JP 11152041 6/1999

OTHER PUBLICATIONS

JPO translation of JP11152041.*
Prassler E. et al.: "An intelligent (semi–) autonomous passenger transportation system", Intelligent transportation systems, 1999. Proceedings. 1999 IEEE/IEEJ/JSAI International Conference on Tokyo, Japan, Oct. 5–8, 1999, Piscataway, NJ, USA, IEEE, US, Oct. 5, 1999 pp. 374–379, XP010369933 ISBN: 0–7803–4975–X.

* cited by examiner

*Primary Examiner*—Jack Lavinder
*Assistant Examiner*—Melanie Torres
(74) *Attorney, Agent, or Firm*—TraskBritt

(57) ABSTRACT

An interactive transporting system for moving people around in an environment, comprising: at least one transporting device (10); an interface device (16) provided on the transporting device (10) and arranged for allowing a user to communicate to the system his personal needs regarding his interaction with the environment; and a driver device designed to drive the transporting device (10) along an optimal path defined according to the needs of the user.

22 Claims, 4 Drawing Sheets

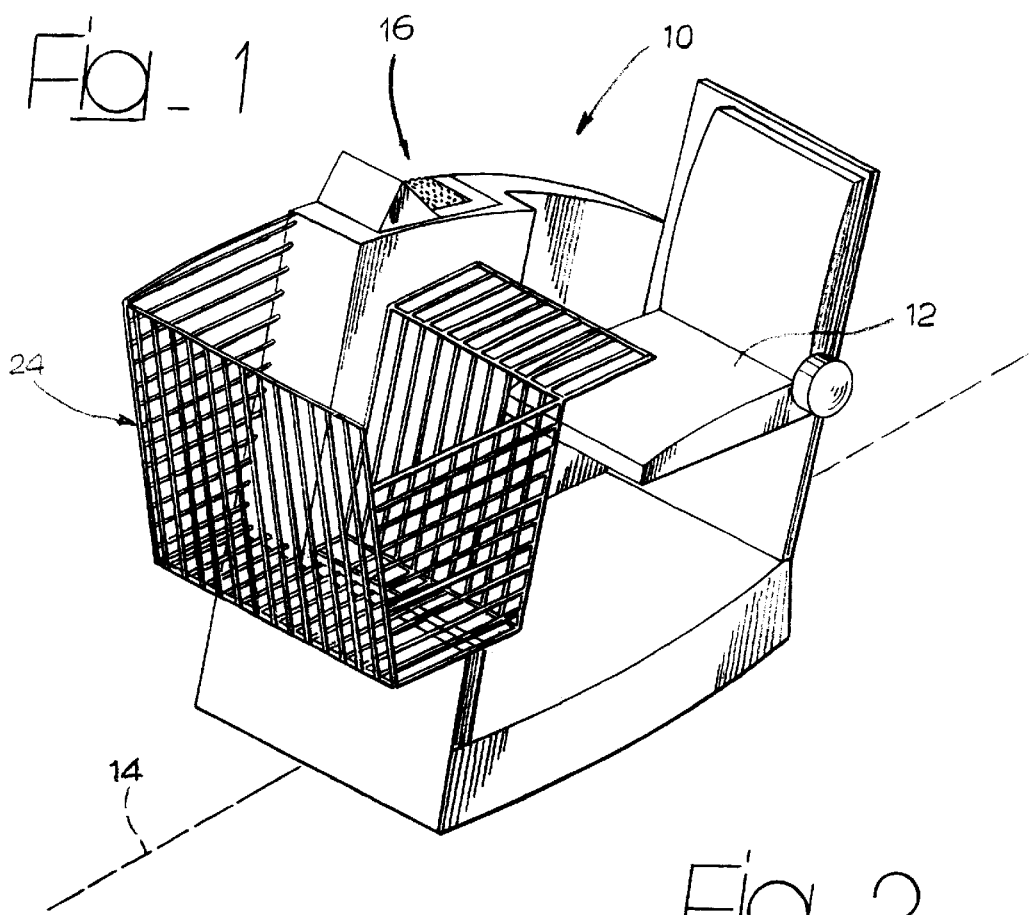
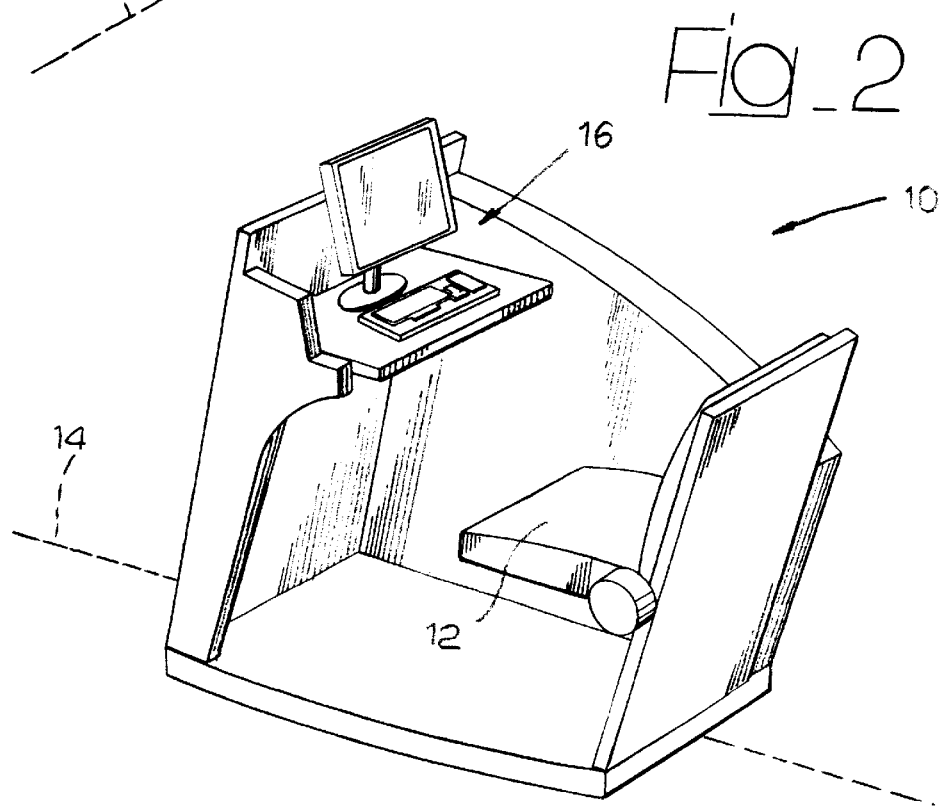

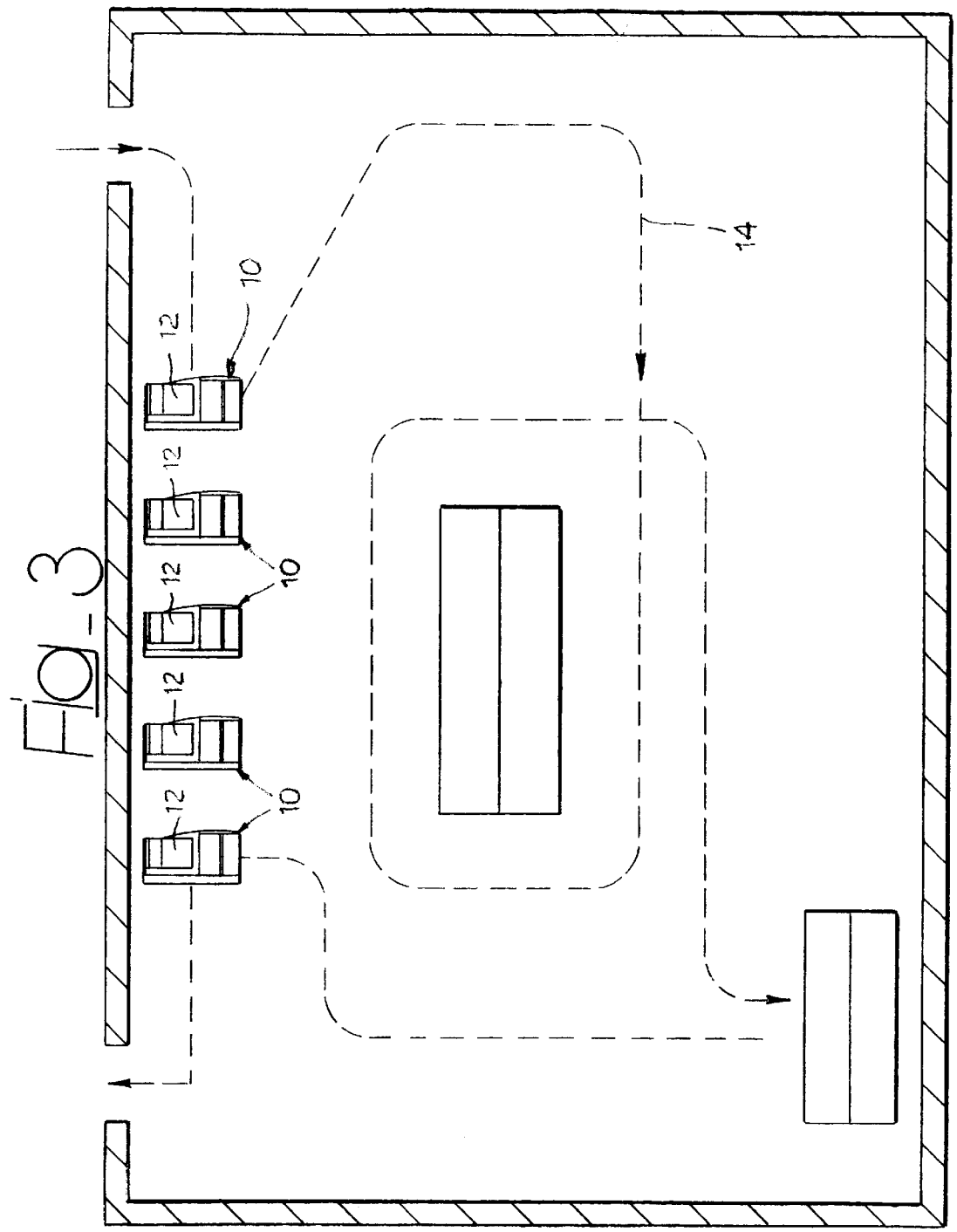

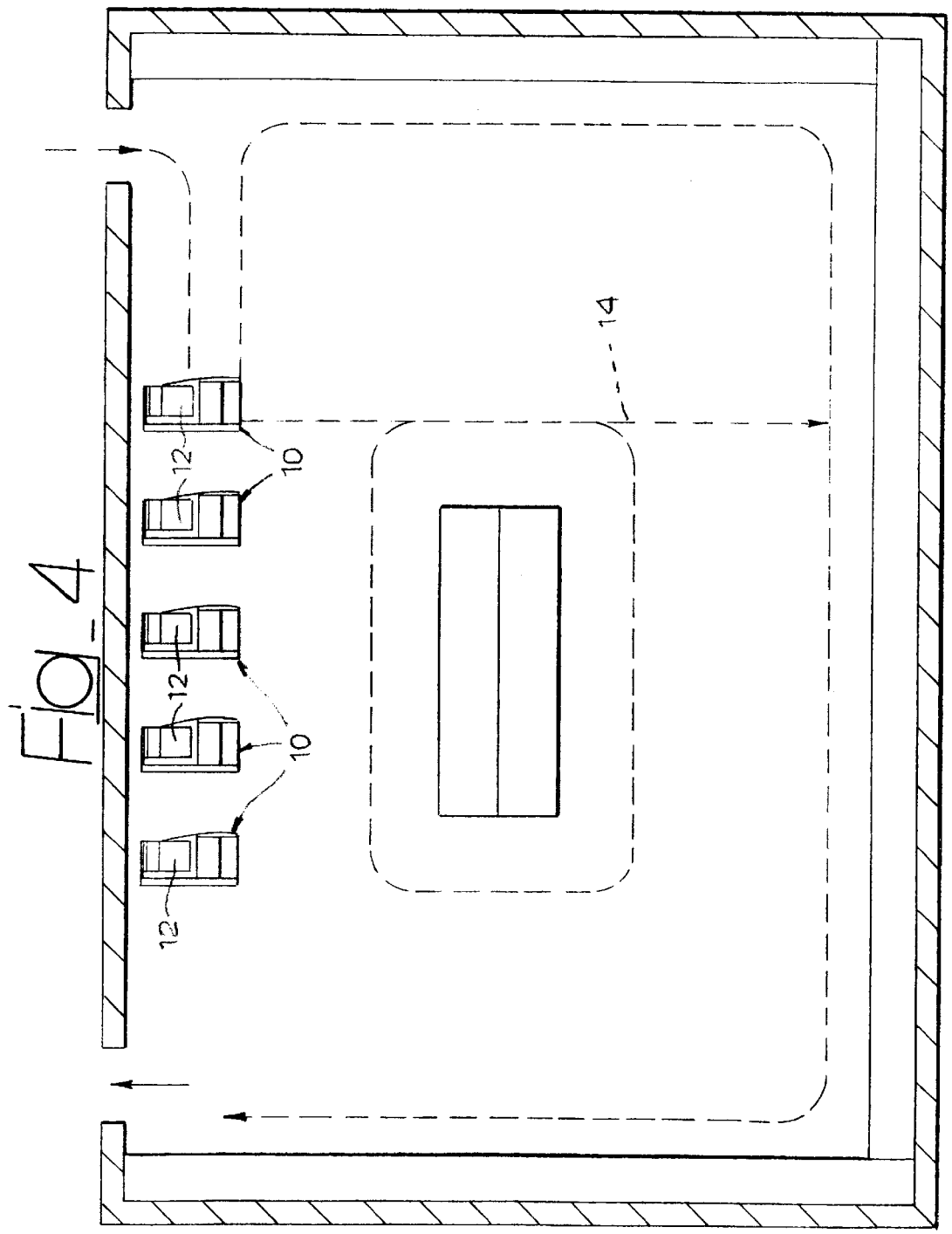

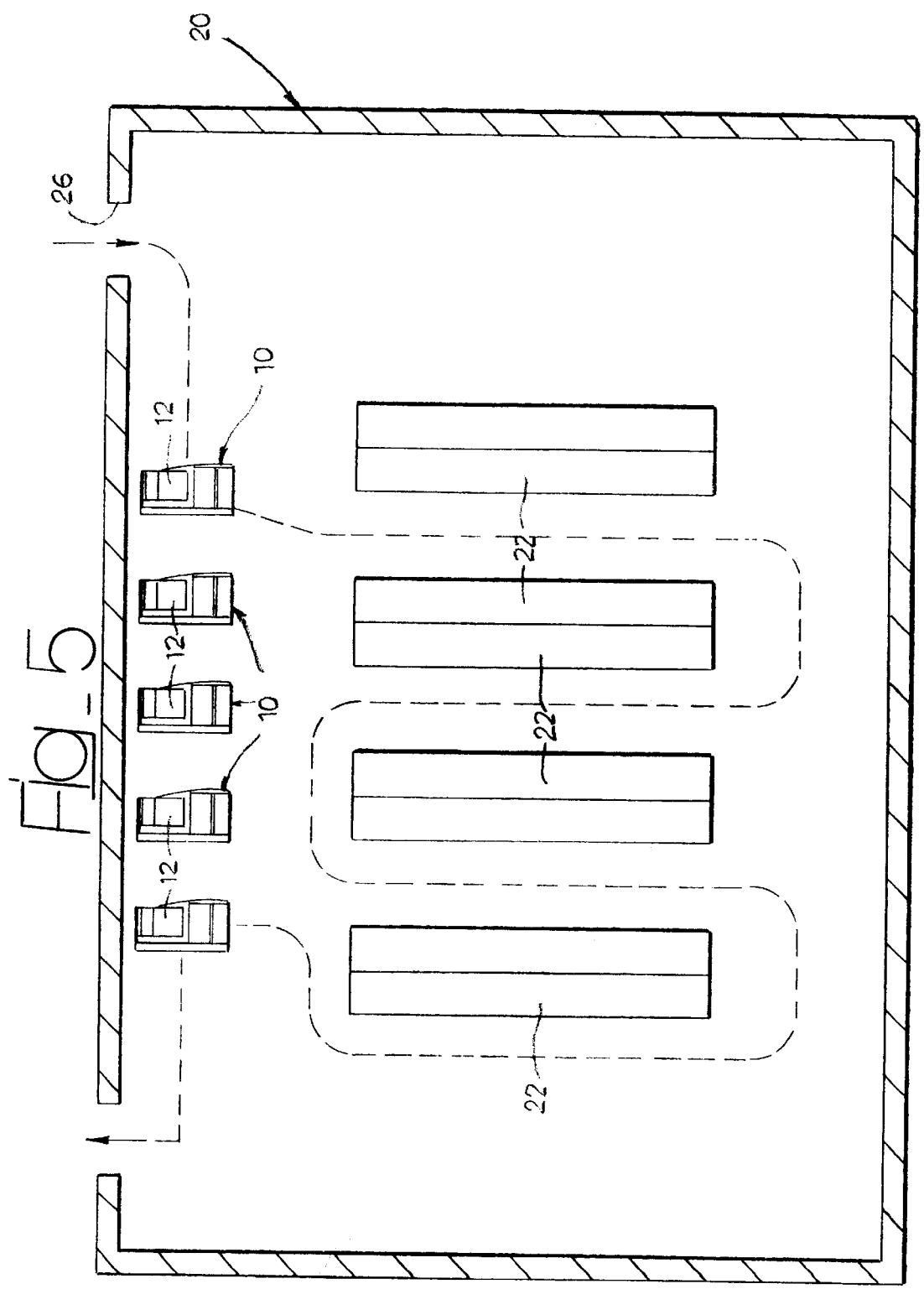

INTERACTIVE TRANSPORTING SYSTEM FOR MOVING PEOPLE AROUND IN AN ENVIRONMENT

BRIEF SUMMARY OF THE INVENTION

The present invention relates to an interactive transporting system for moving an environment.

The present invention may find application in all environments in which people move about through different areas of the environment to satisfy specific personal requirements. for instance, the present invention may find application in areas such as commercial centres, exhibitions, trade fairs, museums, archives, railway stations, airports, car dealer showrooms, etc. In general, when a user visits one of these environments he must move around along a path that takes him into one or more different places of the same environment. The places that the user intends to visit depend upon the specific needs of the user himself, and the path of each user in the environment will generally be different from that of other users. The optimal path that can take the user through all the places of interest inside one and the same environment with the minimum expenditure in terms of time and energy is generally unknown beforehand to the user, except for the few cases in which the user has a deep knowledge of the environment.

The present invention has been developed with the aim of providing an interactive transporting system that enables the problems linked to the need for moving people around in an environment to be solved in the most convenient way possible.

According to the present invention, the above purpose is achieved by a transporting system having the characteristics forming the subject of the claims.

BRIEF DESCRIPTION OF THE SEVERAL VIEWS OF THE DRAWINGS

The present invention will now be described in detail with reference to the attached drawings, which are provided purely by way of nonlimiting examples and in which:

FIGS. 1 and 2 illustrate two embodiments exemplifying a transporting device designed to be used in a transporting system in accordance with the present invention; and FIGS. 3, 4 and 5 are schematic plan views illustrating the operation of the transporting system according to the present invention.

DETAILED DESCRIPTION OF THE INVENTION

With reference to FIGS. 1 and 2, the number 10 designates an individual transporting device equipped with a seat 12 on which a user can sit down. The transporting device 10 is provided with a system for electrical operation which includes an accumulator battery, an electric motor and at least one driving wheel. In addition, the transporting device 10 comprises an electrically controlled driving system. Preferably the transporting device 10 is provided with a driving wheel and a steering wheel. The steering of said wheel may, for example, be controlled by a driving system which includes a telecamera that is designed to recognize a driving track 14 and to control steering of the driving wheel so that the transporting device 10 will follow a track 14 selected according to the path that the transporting device 10 is to travel along.

Each transporting device 10 comprises a computer terminal 16 constituting an interface between the transporting device 10 and the user. The terminal 16 enables a user to request information on products and/or services available in the environment in which the transporting device 10 is able to move around. The computer terminal 16 is designed for meeting the specific needs of the activity performed in the environment which, according the particular cases, may be a retailing activity, an exhibition activity of a commercial or cultural type (trade fairs, museums, archives, etc.) or a transportation service by land, air or sea. From the seat 12 provided the user interacts with the system which, according to the information requested, defines a transporting path within the environment, optimized so as to satisfy the user's requests.

After receiving the information from the user and after an optimal transporting path has accordingly been defined, the transporting device 10, with the user on board, starts on its path, which will take the user to the parts of the environment that represent points of interest for him. While he is being transported, the user can carry out other activities of interaction with the computer terminal 16 or else can simply let himself be carried along the pre-established path by the transporting device.

Described in what follows by way of example are certain specific applications of the interactive transporting system according to the present invention.

With reference to FIGS. 1 and 5, the transporting device 10 can be configured to move around inside a commercial centre designated as a whole by 20 in FIG. 5, in which various exhibition areas 22 for exhibiting products are provided. As illustrated in FIG. 1, the transporting device 10 may assume the form of a motorized trolley, equipped with a basket 24 designed to receive the products that the user intends to purchase.

With reference to FIG. 5, the user enters the commercial centre by the entrance designated by 26 and occupies the seat 12 of a transporting device 10 located, together with a series of other identical devices, in the vicinity of the entrance. By means of the terminal 16, the user selects the list of products which he wishes to buy. The terminal 16 may be equipped with audio/video interfaces by means of which it can interact with the user to propose other products or to provide useful information on products and/or services. Once this operation is concluded, the transporting device and the driving system in association with the computer warehousing system of the commercial centre, recognize the optimal path, and the transporting device 10 starts to move along the established path. During the journey the user can employ his time sitting comfortably on the seat, and once the operation is concluded, can head towards the exit, with the shopping already deposited in bags ready to be transported outside, thus leaving the mobile device 10 available for other users. During the journey around the sales area of the commercial centre, the transporting device 10 stops sequentially in the areas in which the products previously requested are exhibited. The user simply has to pick up the product and deposit it in the basket 24 set on board the transporting device 10. Possibly, the transporting device 10 may be equipped with magnetic sensors or bar code readers that make it possible to recognize the type of product and the corresponding price. The transporting device 10 may therefore perform the function of a mobile cash register, which may possibly be arranged for enabling payment with credit cards or the like so as to avoid passing through a traditional cash desk.

FIG. 2 illustrates a transporting device 10 of the type that may be used in exhibition areas, trade fairs, museums, archives, etc. The transporting device 10 may be used by operators forming part of the organization of the exhibition, trade fair, etc., or else by visitors. As illustrated schematically in FIG. 3, the user takes his place on the seat 12 of an available transporting device and interacts with the terminal of the transporting device to obtain and supply information on products/services of interest to him. After receiving the information from the user, the system defines the optimal path to enable the user to visit the areas that regard the products/services of interest to him. The transporting device moves along the path and stops at predetermined points to allow the user to get off and visit a certain area or else to render a service of information to the user/visitor by means of the terminal, at an area of interest.

The transporting device 10 may also be used by specialized staff, such as hostesses, scientific popularizers, personnel responsible for providing information on services, etc., who can move around the exhibition area to provide an information service to the users. Specialized operators will be able to use the terminal 10 to program the transporting path and to obtain the information necessary for carrying out their information service for the users.

A further sector of application of the system according to the present invention is that of ticket offices, airport check-in desks, self-banking, etc. In these examples of application it is possible to provide a service without an operator in which the transporting device 10 is equipped with terminals and accessories, such as automatic payment systems using credit cards and systems for issuing tickets on board. A user who gets onto the transporting device 10 sets the destination or the service that he wishes to receive, and the transporting device takes the user, for example, to the embarkation point. Along the way the user may purchase a ticket and make the payment for it. For instance, in the case of a railway station ticket office, the user gets onto the transporting device, types in his destination, date and time of the departure of the train and other information, and the transporting device takes him to the embarkation point. The user may buy a ticket from an automatic system for issuing tickets set on the transporting device 10 or located at the end of the path.

A further example of application of the system according to the present invention is that of a dealer's showroom, such as a car showroom. As illustrated schematically in FIG. 4, the customer/user enters the showroom and gets onto a transporting device 10 equipped with video terminal. The firm provides the terminal with information on the products exhibited, possibly with the aid of films that enable the customer to acquire information on the quality of the goods. Using the terminal 10, the customer can choose the product that he wishes to examine, and the transporting device 10 takes the user into the area in which the product (for example, a car) selected by him is exhibited. Whilst the transporting device 10 is turning round the exhibited product, the terminal 16 can explain to the user aspects of the product that are not readily identifiable visually, for example through a vocal system, possibly equipped with earphones. As the customer chooses, the transporting device may conclude its journey around or within the product, while the customer can get off the device and physically touch the product or else decide to proceed on his journey by re-enabling the system. The transporting device 10 will thus take the customer to an area where an operator will be present with whom he can define the contractual and economic aspects of the transaction that is to be made or from whom he can ask for further clarifications or explanations regarding the product.

What is claimed is:

1. An interactive transporting system for moving people around in an environment, comprising:

at least one transporting device including a seat for a user;

a computer provided on the transporting device, said computer constituting an interface between said transporting device and said user, said computer being configured to allow said user to communicate to said transporting system his personal needs regarding his interaction with the environment, and said computer defining an optimal transporting path within the environment defined so as to satisfy said user's personal needs; and an automated drive system, mechanically associated with said transporting device, said automated drive system being intercooperated with said computer to receive information from said computer regarding said optimal transporting path and thereafter to drive the transporting device along said optimal path.

2. The system according to claim 1, wherein the aforesaid interface is arranged for receiving from the user information on products and/or services available in the environment.

3. The system according to claim 1, wherein said drive system is an independent, motor-driven system for driving said transporting device along said optimal path responsive to information received from said computer.

4. The system according to claim 1, wherein the aforesaid interface is programmed to provide the user with information on products and/or services available in the environment.

5. The system according to claim 1, wherein each transporting device is equipped with means designed for receiving a payment via a payment card.

6. The system according to claim 1, wherein each transporting device is equipped with means for issuing tickets and/or receipts of payment.

7. An interactive transporting system for moving people around in an environment, comprising:

a transporting device having a seat for a user;

a computer, provided on the transporting device, said computer constituting an interface between said transporting device and said user, said computer being configured to allow said user to communicate information to said transporting system regarding his personal needs regarding his interaction with the environment, and said computer being configured to receive said information and utilize said information to define an optimal transporting path within the environment to satisfy said user's personal needs;

said optimal transporting path being discernible;

a sensor, mechanically associated with said transporting device, said sensor being configured to detect said optimal transporting path and thereafter communicate data regarding said optimal transporting path to said computer; and an automated drive system for driving said transporting device, said automated drive system being intercooperated with said computer, said computer being configured to receive said data from said sensor regarding said optimal transporting path and thereafter to utilize said data to formulate and communicate instructions to said automated drive system regarding travel along said optimal transporting path, said automated drive system being configured to drive the transporting device along said optimal transporting path responsive to said instructions.

8. The system according to claim 7, wherein said optimal transporting path is optically discernible and said sensor is a telecamera.

9. An interactive transporting system for moving people around in an environment, comprising:

a transporting device;

interface structure, provided on said transporting device, wherein said interface structure is configured to allow a user to communicate to said transporting system his personal needs regarding his interaction with the environment, wherein said interface structure is programmed to provide the user with information on products and/or services available in the environment; and an automated drive device, mechanically associated with said transporting device for driving the transporting device along an optimal path defined by said interface structure, according to the needs of the user.

10. The system according to claim 9, wherein said transporting device is equipped with a sensor, configured to detect said optimal path and relay data regarding said optimal path to said interface structure, said interface structure being configured to utilize said data to formulate instructions regarding said optimal path and subsequently to transmit said instructions to said automated drive device, said automated drive device being configured to receive said instructions and utilize said instructions to conduct said transporting device along said optimal path.

11. An interactive transporting system for moving people around in an environment, comprising:

a transporting device equipped with means designed for receiving a payment via a payment card;

an interface device provided on said transporting device, said interface device being configured to allow a user to communicate to said transporting system his personal needs regarding his interaction with the environment; and an automated drive system associated with said transporting device designed to drive the transporting device along an optimal path defined according to the needs of the user.

12. The system according to claim 11, wherein said transporting device is equipped with an autonomous motor-driven system and driving means designed to conduct said transporting device along said optimal path.

13. An interactive transporting system for moving people around in an environment, comprising:

at a transporting device equipped with a device for issuing tickets and/or receipts of payment;

an interface structure provided on said transporting device, said interface structure being configured to allow a user to communicate to said transporting system his personal needs regarding his interaction with the environment; and a drive structure designed to drive the transporting device along an optimal path defined according to the needs of the user.

14. The system according to claim 13, wherein said transporting device is equipped with an autonomous motor-driven system and a driving structure designed to conduct said transporting device along said optimal path.

15. An interactive transporting system for moving people around in an environment, comprising:

a transporting device;

an interface device provided on said transporting device, wherein said interface device is configured to allow a user to communicate to said transporting system his personal needs regarding his interaction with the environment, said interface device being configured to provide to said user information on products and/or services available in the environment; and an automated driver device to drive the transporting device along an optimal path defined according to the needs of the user.

16. The system according to claim 15, wherein said transporting device is equipped with an autonomous motor-driven system and a driving device designed to conduct said transporting device along said optimal path.

17. An interactive transporting system for moving people around in an environment, comprising:

at least one transporting device configured for transporting at least one person;

an interface device provided on said transporting device, said interface device being configured to allow a user to communicate to said transporting system his personal needs regarding his interaction with the environment, said interface device being programmed to provide the user with information on products and/or services available in the environment; and an automated driver device designed to drive the transporting device along an optimal path defined by said transporting system according to the needs of the user.

18. The system according to claim 17, wherein each one of said transporting devices is equipped with an autonomous motor-driven system and a driving device designed to conduct said transporting device along said optimal path.

19. An interactive transporting system for moving people around in an environment, comprising:

at least one transporting device equipped with a payment-processing device configured to receive a payment via payment card, an interface device provided on said transporting device, said interface device being configured to allow a user to communicate to said transporting system his personal needs regarding his interaction with the environment; and an automated driver device designed to drive the transporting device along an optimal path defined by said transporting system according to the needs of the user.

20. The system according to claim 19, wherein each one of said transporting device is equipped with an autonomous motor-driven system and a driving device designed to conduct said transporting device along said optimal path.

21. An interactive transporting system for moving people around in an environment, comprising:

at least one transporting device equipped with printing device for issuing tickets and/or receipts of payment;

an interface device provided on said transporting device, said interface device being configured to allow a user to communicate to said transporting system his personal needs regarding his interaction with the environment; and an automated driver device designed to drive the transporting device along an optimal path defined by said transporting system according to the needs of the user.

22. The system according to claim 21, wherein each one of said transporting device is equipped with an autonomous motor-driven system and a driving device designed to conduct said transporting device along said optimal path.

* * * * *